(12) United States Patent
Chen et al.

(10) Patent No.: US 12,535,421 B2
(45) Date of Patent: Jan. 27, 2026

(54) GASIFICATION TAR MONITORING SYSTEM, GASIFICATION TAR MONITORING METHOD AND GASIFICATION TAR MONITORING DEVICE

(71) Applicants: TIANJIN UNIVERSITY, Tianjin (CN); CIVIL AVIATION UNIVERSITY OF CHINA, Tianjin (CN)

(72) Inventors: Guanyi Chen, Tianjin (CN); Jian Li, Tianjin (CN); Da Chen, Tianjin (CN); Beibei Yan, Tianjin (CN); Junyu Tao, Tianjin (CN); Wei Zhang, Tianjin (CN); Zhanjun Cheng, Tianjin (CN); Shengquan Zhou, Tianjin (CN)

(73) Assignees: TIANJIN UNIVERSITY, Tianjin (CN); CIVIL AVIATION UNIVERSITY OF CHINA, Tianjin (CN)

( * ) Notice: Subject to any disclaimer, the term of this patent is extended or adjusted under 35 U.S.C. 154(b) by 145 days.

(21) Appl. No.: 18/574,659

(22) PCT Filed: Oct. 20, 2021

(86) PCT No.: PCT/CN2021/124858
§ 371 (c)(1),
(2) Date: Dec. 27, 2023

(87) PCT Pub. No.: WO2023/273021
PCT Pub. Date: Jan. 5, 2023

(65) Prior Publication Data
US 2024/0319100 A1 Sep. 26, 2024

(30) Foreign Application Priority Data

Jun. 30, 2021 (CN) .......................... 202110740264.0

(51) Int. Cl.
*G01N 21/65* (2006.01)
*C10J 3/72* (2006.01)
(Continued)

(52) U.S. Cl.
CPC .............. *G01N 21/65* (2013.01); *C10J 3/723* (2013.01); *G01J 3/44* (2013.01); *G01N 1/28* (2013.01);
(Continued)

(58) Field of Classification Search
CPC ............ G01N 21/65; G01N 1/28; G01N 1/34; G01N 21/01; G01N 21/85; G01N 1/2205;
(Continued)

(56) References Cited

U.S. PATENT DOCUMENTS 8,054,082 B2 * 11/2011 Brothier ............. G01N 33/0047
250/389
2003/0030800 A1 * 2/2003 Golden ..................... G01J 3/28
356/301
(Continued)

FOREIGN PATENT DOCUMENTS

| CN | 104713867 | 6/2015 |
|---|---|---|
| CN | 105806825 | 7/2016 |

(Continued)

OTHER PUBLICATIONS

International Search Report and Written Opinion, issued in the corresponding PCT Application No. PCT/CN2021/124858, dated Apr. 8, 2022, 14 pages.
(Continued)

*Primary Examiner* — Michelle M Iacoletti
*Assistant Examiner* — Noah J. Haney
(74) *Attorney, Agent, or Firm* — HSML P.C.

(57) ABSTRACT

The system includes a dust collector, a pressure controller, a dryer, a gas heat-insulation device, a gas pool, a gas
(Continued)

detector, an optical monitor and a computer sequentially connected. The dust collector is used to filter solid particles in a gas. The pressure controller is used to control a flow rate of the gas. The dryer is used to control a humidity of the gas. The gas heat-insulation device is used to control a temperature of the gas. The gas pool is used to carry the gas. The laser is used to irradiate the gas in the gas pool to generate a Raman scattering light. The gas detector is used to collect the Raman scattering light. The optical monitor is used to adjust and amplify a light signal of the Raman scattering light. The computer is used to output a Raman spectrum and a composition and content of a tar.

8 Claims, 3 Drawing Sheets

(51) Int. Cl.
G01J 3/44 (2006.01)
G01N 1/22 (2006.01)
G01N 1/28 (2006.01)
G01N 1/34 (2006.01)
G01N 21/01 (2006.01)
G01N 21/85 (2006.01)

(52) U.S. Cl.
CPC .............. *G01N 1/34* (2013.01); *G01N 21/01* (2013.01); *G01N 21/85* (2013.01); *G01N 1/2205* (2013.01); *G01N 1/2247* (2013.01); *G01N 2001/227* (2013.01); *G01N 2021/0112* (2013.01); *G01N 2021/8557* (2013.01); *G01N 2021/8578* (2013.01)

(58) Field of Classification Search
CPC ........... G01N 1/2247; G01N 2001/227; G01N 2021/0112; G01N 2021/8557; G01N 2021/8578; C10J 3/723; G01J 3/44
USPC ........................................................ 356/301
See application file for complete search history.

(56) References Cited

U.S. PATENT DOCUMENTS

| | | | |
|---|---|---|---|
| 2004/0151436 A1* | 8/2004 | Chan | G01J 3/0218 385/39 |
| 2013/0019528 A1* | 1/2013 | Mall | C10K 1/101 48/87 |
| 2016/0258876 A1* | 9/2016 | Al Hosani | G01J 3/44 |
| 2019/0056317 A1* | 2/2019 | Clausen | G01N 21/314 |
| 2022/0128459 A1* | 4/2022 | Lecompte | G01N 21/33 |

FOREIGN PATENT DOCUMENTS

| | | | | |
|---|---|---|---|---|
| CN | 106198886 | | 12/2016 | |
| CN | 106483115 | | 3/2017 | |
| CN | 206074547 | | 4/2017 | |
| CN | 206074547 U | * | 4/2017 | |
| CN | 106932378 | | 7/2017 | |
| CN | 106932378 A | * | 7/2017 | ............. G01N 21/65 |
| CN | 108303395 A | * | 7/2018 | ............. G01N 1/28 |
| CN | 108426872 A | * | 8/2018 | ............. G01N 21/65 |
| CN | 113466207 | | 10/2021 | |
| JP | 2013160703 A | * | 8/2013 | |
| JP | 2014-115117 | | 4/2014 | |
| JP | 2005024250 A | * | 1/2015 | |

OTHER PUBLICATIONS

Karellas et al., Analysis of the product gas from biomass gasification by means of laser spectroscopy, Optics and Lasers in Engineering, vol. 45, 2007, pp. 935-946.

* cited by examiner

GASIFICATION TAR MONITORING SYSTEM, GASIFICATION TAR MONITORING METHOD AND GASIFICATION TAR MONITORING DEVICE

CROSS REFERENCE TO RELATED APPLICATION

This application is a Section 371 National Stage Application of International Application No. PCT/CN2021/124858, filed on Oct. 20, 2021, entitled "GASIFICATION TAR MONITORING SYSTEM, GASIFICATION TAR MONITORING METHOD AND GASIFICATION TAR MONITORING DEVICE", which claims priority to Chinese Application No. 202110740264.0, filed on Jun. 30, 2021, the entire content of which is incorporated herein by reference in its entirety.

TECHNICAL FIELD

The present disclosure relates to fields of industrial pollutant emission control and monitoring, and in particular, to a gasification tar monitoring system, a monitoring method and a device.

BACKGROUND

Biomass energy is an important renewable energy. Nowadays, when fossil energy is increasingly exhausted, a transformation and utilization technology of biomass energy has attracted more and more attention. Gasification technology is an important direction for the utilization of biomass energy. The gasification technology and subsequent purification and improvement processes may transform biomass into high-quality gas fuels, biological oil and biomass char. However, a tar is inevitably produced in a gasification process. The tar is a complex mixture, of which mainly ingredients are monocyclic to polycyclic aromatic hydrocarbons, which have certain risks of carcinogenic and environmental pollution. At the same time, the tar in the gasification gas gradually condenses from 500° C., so that a blockage of gas pipeline is caused and a pipeline pressure is increased, thereby bringing an explosion risk. The combustion efficiency may be reduced and a downstream burner may be damaged by the tar in the gas. Therefore, a control and removal of the tar in the gasification process are critical.

The solution to the tar problem depends on accurate monitoring of the tar. Accurate and timely tar monitoring data may provide a basis for an adjustment of the entire process and guarantee a quality of the gasification product. Relevant tar monitoring technologies mainly include two types, one of which is a non-online method of "on-site sampling-laboratory analysis". Although this method may obtain a content and composition of the tar in the gasification gas, a test device is expensive, a measurement cycle is long, and it is impossible to provide real-time tar data, so that it is not conducive to timely adjusting the gasification process. At the same time, the composition of the tar is complex and prone to change. In long-term sampling and transportation, it is easy to cause sample deterioration, thereby affecting an accuracy of test. Another method is to obtain tar content data through a two-stage mass flow meter sampling analysis method. Although this method may also achieve real-time online monitoring of the content of the tar, it is impossible to obtain the specific situation of the composition of the tar. In addition, the online monitoring of the tar faces problems such as high temperature (temperature of an exit of a gasifier is higher than 400° C.) of the gas to be tested, complex gas component, certain corrosiveness, and high dust content. Such direct measurement often lacks accuracy and may not be operated for a long time.

SUMMARY

In view of this, the present disclosure provides a gasification tar monitoring system, a monitoring method and a device, so as to at least partially solve the technical problems mentioned above.

Embodiments of the present disclosure provide a gasification tar monitoring system, including a dust collector, a pressure controller, a dryer, a gas heat-insulation device, a gas pool, a gas detector, an optical monitor and a computer, which are sequentially connected. The dust collector is configured to filter solid particles in a gas when disposed at an exit of a gasifier. The pressure controller is configured to control a flow rate of the gas. The dryer is configured to control a humidity of the gas. The gas heat-insulation device is configured to control a temperature of the gas. The gas pool is configured to carry the gas. One end of the gas detector is connected to a laser through a first optical fiber. The laser is configured to irradiate the gas in the gas pool to generate a Raman scattering light. The gas detector is configured to collect the Raman scattering light. Another end of the gas detector is connected to the optical monitor through a second optical fiber. The optical monitor is configured to adjust and amplify a light signal of the Raman scattering light. The computer is configured to output a Raman spectrum and a composition and content of a tar.

According to embodiments of the present disclosure, the dust collector includes any one of ceramic film or quartz film.

According to embodiments of the present disclosure, the laser includes a laser with an output wavelength of 532 nm.

According to embodiments of the present disclosure, a temperature inside the gas heat-insulation device is between 300° C. to 600° C.

According to embodiments of the present disclosure, the gas pool includes a corrosion-resistant chamber. A socket is provided on the corrosion-resistant chamber. The socket is configured to mount the gas detector.

According to embodiments of the present disclosure, the corrosion-resistant chamber includes a nickel-based alloy chamber.

According to embodiments of the present disclosure, the optical monitor includes a Fourier Raman spectroscopy optical path configured to adjust an optical path of the Raman scattering light; and a charge coupled device configured to amplify a light signal of the adjusted Raman scattering light.

Embodiments of the present disclosure further provide a method for monitoring a gasification tar using the system mentioned above, including: inputting gaseous standard compounds with different concentrations into the system sequentially and outputting at least one group of standard characteristic spectrum peaks; determining a standard curve function of the standard compound through heights of spectrum peaks of each group of standard characteristic spectrum peaks and the concentration of the standard compound; inputting a gas into the system and outputting at least one group of characteristic spectrum peaks; determining a type of a compound by comparing the characteristic spectrum peak with the standard characteristic spectrum peak; determining a concentration of the compound corresponding to a height of the characteristic spectrum peak through the standard curve function corresponding to the compound; and determining a concentration of a tar in the gas through the concentration of the compound.

According to embodiments of the present disclosure, the standard compound includes any one of benzene, toluene, xylene, naphthalene or phenol.

Embodiments of the present disclosure further provide a gasification tar monitoring device, including the system mentioned above.

REFERENCES SIGNS

1—Dust collector; 2—Pressure controller; 3—Dryer; 4—Gas heat-insulation device; 5—Gas pool; 6—Gas detector; 7—First optical fiber; 8—Second optical fiber; 9—Laser; 10—Fourier Raman spectrum optical path; 11—Charge coupled device; 12—Optical monitor; 13—Computer.

DETAILED DESCRIPTION OF EMBODIMENTS

In order to make the purpose, technical solution, and advantages of the present disclosure clearer, the present disclosure is further explained in detail in conjunction with specific embodiments and with reference to the accompanying drawings.

Raman spectroscopy is an emerging monitoring technology that is gradually being applied in fields such as rapid monitoring of pollutants. The Raman spectroscopy may obtain characteristic peaks of molecular vibration and rotation information of reactants based on Raman scattering effect. The Raman spectroscopy is fast, simple and reproducible. It is possible to perform non-destructive qualitative and quantitative analysis. Samples may be directly measured through a fiber optic probe, so that non-contact and online monitoring feedback is achieved. With the help of the above characteristics, the Raman spectroscopy is gradually being applied in fields such as pollutant emission monitoring, online detection of logging gas, and online monitoring of coalification gas. The Raman spectroscopy has broad application prospects.

Based on this, the present disclosure provides a gasification tar monitoring system, a monitoring method and a device. By using in situ Raman spectroscopy, the gasification tar is accurately analyzed, the content and composition of the tar is recorded, and non-direct online monitoring technology is used, so as to break through the technical bottleneck of in situ monitoring of the tar, and provide a basis for adjustment and optimization of the gasification process.

Embodiments of the present disclosure provide a gasification tar monitoring system, including a dust collector, a pressure controller, a dryer, a gas heat-insulation device, a gas pool, a gas detector, an optical monitor and a computer, which are sequentially connected. The dust collector is used to filter solid particles in a gas when disposed at an exit of a gasifier. The pressure controller is used to control a flow rate of the gas. The dryer is used to control a humidity of the gas. The gas heat-insulation device is used to control a temperature of the gas. The gas pool is used to carry the gas. One end of the gas detector is connected to a laser through a first optical fiber. The laser is used to irradiate the gas in the gas pool to generate a Raman scattering light. The gas detector is used to collect the Raman scattering light. Another end of the gas detector is connected to the optical monitor through a second optical fiber. The optical monitor is used to adjust and amplify a light signal of the Raman scattering light. The computer is used to output a Raman spectrum and a composition and content of a tar.

Figure 1:
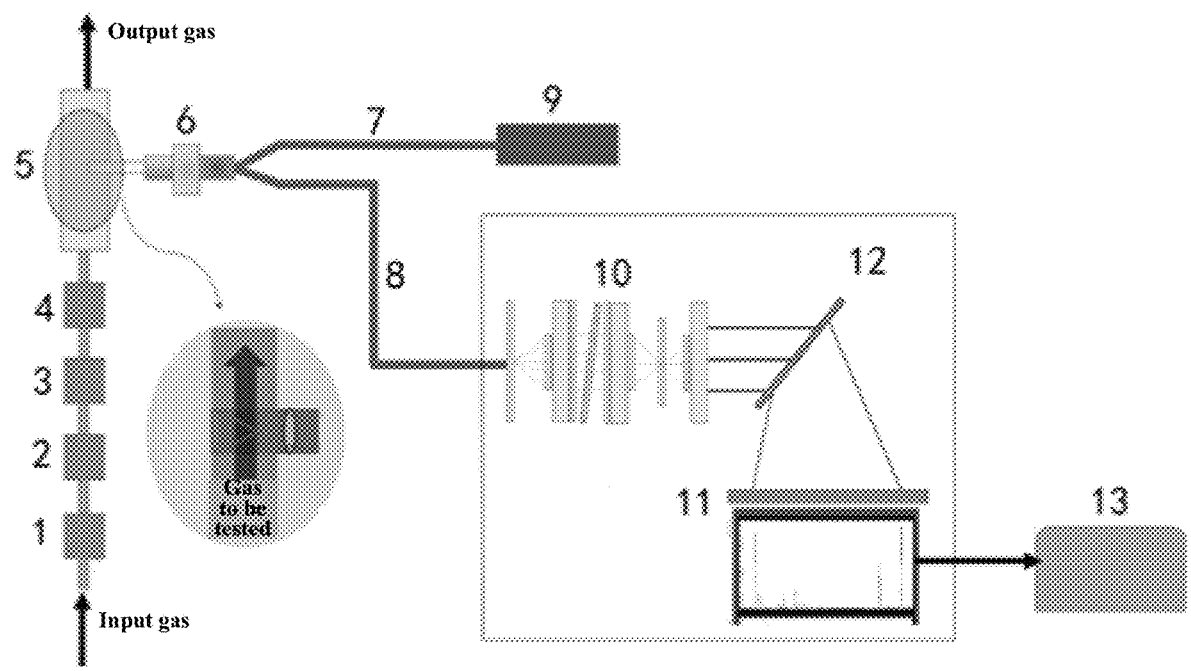
FIG. 1 schematically shows a schematic diagram of a monitoring system of an embodiment of the present disclosure.

FIG. 1 schematically shows a schematic diagram of a monitoring system of an embodiment of the present disclosure.

As shown in FIG. 1, a gasification tar monitoring system includes a dust collector 1, a pressure controller 2, a dryer 3, a gas heat-insulation device 4, a gas pool 5, a gas detector 6, an optical monitor 12 and a computer 13, which are sequentially connected. The gas detector 6 is disposed on the gas pool 5. The gas detector 6 is connected to the laser 9 through a first optical fiber 7. The gas detector 6 is connected to the optical monitor 12 through a second optical fiber 8.

In embodiments of the present disclosure, solid particles are removed from a gasification tar through disposing the dust collector 1 at an exit of a gasifier. Then, the gasification tar is maintained a stable gas state to enter the gas pool 5 through disposing the pressure controller 2, the dryer 3 and the gas heat-insulation device 4. Through disposing the laser 9 on the gas pool 5 for irradiating the gas to generate the Raman scattering light, after a light signal is adjusted and amplified by the gas detector, a Raman spectrum and a composition and content of the tar are output in the computer, thereby realizing in situ monitoring of the composition and content of the gasification tar at the exit of the gasifier.

According to embodiments of the present disclosure, the dust collector includes any one of ceramic film or quartz film.

In embodiments of the present disclosure, due to the presence of a large amount of solid particles in the gasifier, the monitoring accuracy of the system is affected. The high-temperature and corrosion-resistant material film such as ceramic film and quartz film are used, so as to prevent the corrosion of high-temperature gasification tar on the dust collector. The dust collector in embodiments of the present disclosure includes but is not limited to ceramic film or quartz film, and other high-temperature and corrosion-resistant films may also be used.

According to embodiments of the present disclosure, the laser includes a laser with an output wavelength of 532 nm.

In embodiments of the present disclosure, when the laser emits a laser with a wavelength of 532 nm to irradiate the gas, a good Raman scattering spectrum may be obtained.

According to embodiments of the present disclosure, a temperature inside the gas heat-insulation device is between 300° C. to 600° C., such as 300° C., 400° C., 500° C. or 600° C.

In embodiments of the present disclosure, since the temperature of the gasification tar at an exit of a biomass gasifier is high and the tar needs to be maintained in a gas state in the monitoring process, the temperature inside the gas heat-insulation device should be maintained within a range of 300° C. to 600° C., so as to avoid gas liquefaction.

According to embodiments of the present disclosure, the gas pool includes a corrosion-resistant chamber. A socket is provided on the corrosion-resistant chamber. The socket is used to mount the gas detector.

In embodiments of the present disclosure, the gas pool is used to carry the gasification tar. Since the corrosiveness of the gasification tar is strong, the corrosion-resistant chamber is used to prevent the corrosion of the gasification tar on the gas pool. At the same time, the gasification tar is enclosed in the gas pool, and the gas detector is mounted on the gas pool through the socket, so as to ensure a closed state of the gas pool. The Raman scattering light may be generated when the laser irradiates the gas.

According to embodiments of the present disclosure, the corrosion-resistant chamber includes a nickel-based alloy chamber.

In embodiments of the present disclosure, the corrosion-resistant chamber includes but is not limited to nickel-based alloy chamber, and other high-temperature and corrosion-resistant chambers may also be used.

According to embodiments of the present disclosure, the optical monitor includes a Fourier Raman spectroscopy optical path used to adjust an optical path of the Raman scattering light; and a charge coupled device used to amplify the light signal of the adjusted Raman scattering light.

As shown in FIG. 1, the optical monitor 12 includes a Fourier Raman spectroscopy optical path 10 and a charge coupled device 11. After the Fourier Raman spectroscopy optical path 10 adjusts an optical path of the Raman scattering light generated by the laser irradiating on the gas, the Raman scattering light signal is amplified by the charge coupled device 11 for the computer to output the Raman spectrum.

Figure 2:
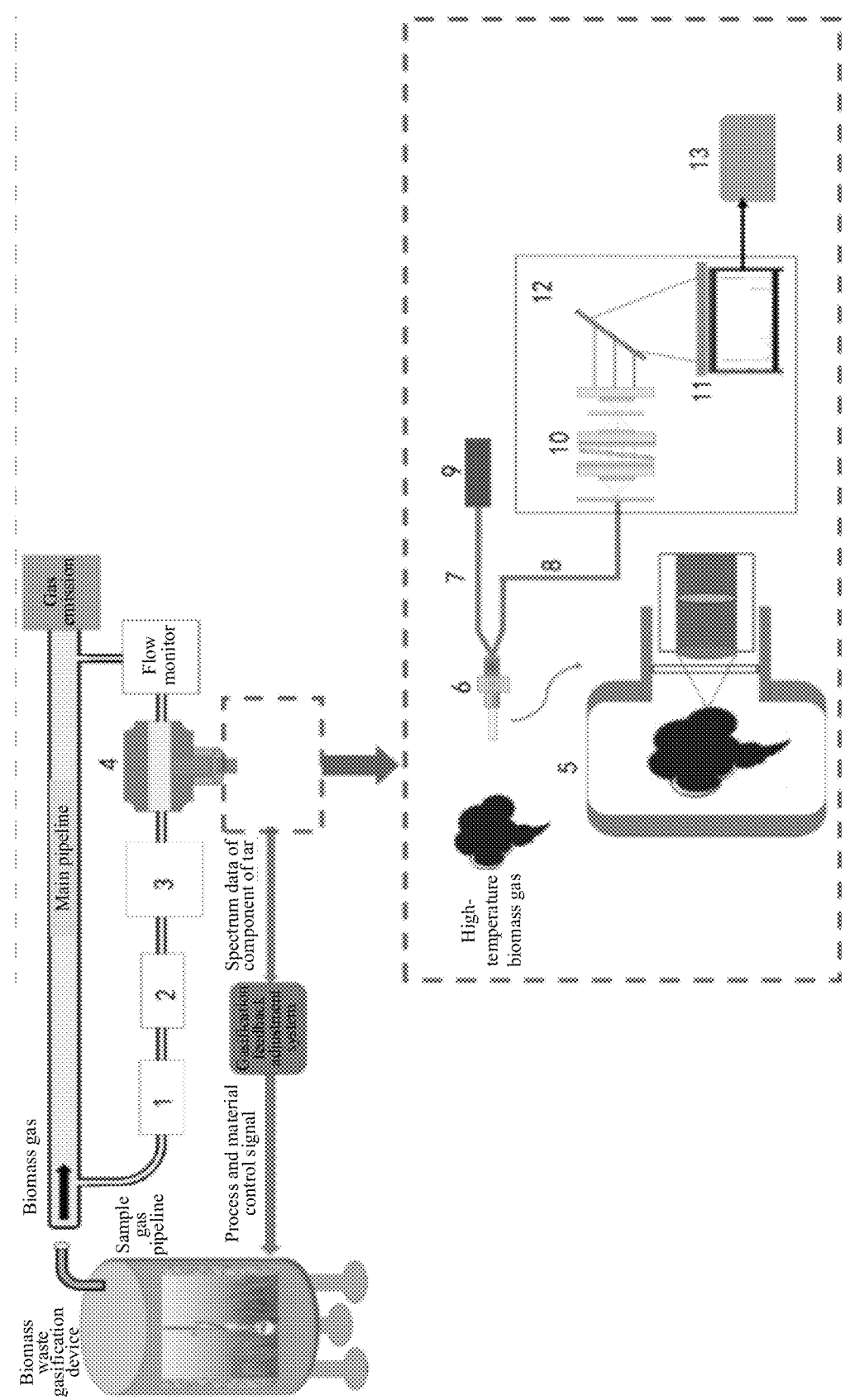
FIG. 2 schematically shows a diagram of an application scenario of a monitoring system of an embodiment of the present disclosure.

FIG. 2 schematically shows a diagram of an application scenario of a monitoring system of an embodiment of the present disclosure.

As shown in FIG. 2, an exit of a biomass waste gasification device discharges biomass gas, which enters the dust collector 1 through a sample gas pipeline and solid particles in the sample gas are filtered and removed. Then, the sample gas enters the pressure controller 2, the dryer 3 and the gas heat-insulation device 4. After adjusting a flow rate, humidity and temperature of the gas, the sample gas (high-temperature biomass gas) enters the gas pool 5. The gas detector 6, is mounted in the gas pool 5. One end of the gas detector 6 is connected to the laser 9 through the first optical fiber 7. The laser emitted by the laser 9 enters the gas detector 6 through the first optical fiber 7, and irradiates the high-temperature biomass gas in the gas pool 5 to generate the Raman scattering light. The Raman scattering light enters the optical monitor 12 through the second optical fiber 8. In the optical monitor 12, after adjusting the optical path of the Raman scattering light by the Fourier Raman spectroscopy optical path 10, the Raman scattering light signal is amplified by the charge coupled device 11 and Raman spectrum data of the tar is output in the computer 13. These Raman spectrum data are identified and converted into a process and material control signal through a gasification feedback adjustment system, and are fed back to the biomass waste gasification device, thereby achieving real-time adjustment of process parameters in the biomass waste gasification device.

In embodiments of the present disclosure, a sapphire window panel is provided in the gas detector 6. The gas detector 6 is designed as a hollow structure, so as to effectively reduce an impact of high temperature on test accuracy.

Embodiments of the present disclosure also provide a method for monitoring a gasification tar using the aforementioned system, including inputting gaseous standard compounds with different concentrations into the system sequentially and outputting at least one group of standard characteristic spectrum peaks; determining a standard curve function of the standard compound through heights of spectrum peaks of each group of standard characteristic spectrum peaks and the concentration of the standard compound; inputting a gas into the system and outputting at least one group of characteristic spectrum peaks; determining a type of a compound by comparing the characteristic peak with the standard characteristic spectrum peak; determining a concentration of the compound corresponding to a height of the characteristic spectrum peak through the standard curve function corresponding to the compound; and determining a concentration of a tar in the gas through the concentration of the compound.

According to embodiments of the present disclosure, the standard compound includes any one of benzene, toluene, xylene, naphthalene or phenol.

According to embodiments of the present disclosure, the benzene, toluene, xylene, naphthalene and phenol are the main components in the gasification tar. The standard compounds in embodiments of the present disclosure include but are not limited to the five compounds mentioned above.

Embodiments of the present disclosure also provide a gasification tar monitoring device, including the system mentioned above.

In embodiments of the present disclosure, the main component compounds in the gasification tar are first used as the standard compound for monitoring in the monitoring system, and corresponding standard characteristic spectrum peaks of the standard compound are obtained. By utilizing the uniqueness of characteristic spectrum peaks of different compounds, when monitoring gas (biomass combustion gas), the Raman spectrum peak is identified to identify the type of a certain compound in a monitoring gas. Due to the characteristic peaks of the standard compound with different concentrations, different heights of spectrum peaks are generated. By fitting a linear function relationship between the concentration and the height of spectrum peak, the height of the identified compound characteristic spectrum peak is measured in the monitoring gas. The compound concentration corresponding to the height of the characteristic spectrum peak is obtained from the linear function relationship between the concentration and the height of spectrum peak, thereby determining a concentration of the tar in the gas.

Figure 3:
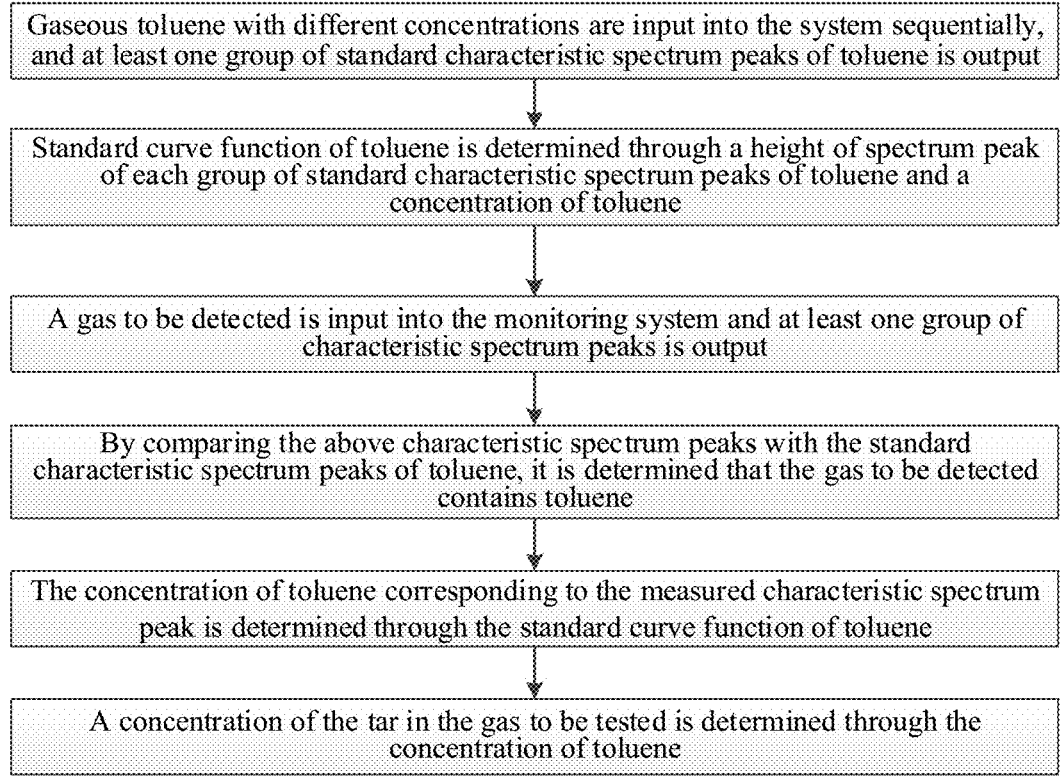
FIG. 3 schematically shows a flowchart of a monitoring method of an embodiment of the present disclosure.

Below, toluene is used as a standard compound to provide a detailed explanation of embodiments of the present disclosure. FIG. 3 schematically shows a flowchart of a monitoring method of an embodiment of the present disclosure.

As shown in FIG. 3, gaseous toluene with different concentrations are input into the system sequentially, and at least one group of standard characteristic spectrum peaks of toluene is output. Standard curve function of toluene is determined through a height of spectrum peak of each group of standard characteristic spectrum peaks of toluene and a concentration of toluene. The height of spectrum peak of the standard characteristic spectrum peaks of toluene and corresponding concentration data of toluene are shown in Sheet 1.

Sheet 1: Heights of spectrum peak of the standard characteristic spectrum peaks of toluene and corresponding concentration data of toluene

| Concentration of toluene (volume percentage %) | Corresponding characteristic spectrum peak height (relative signal strength) |
|---|---|
| 0.46 | 760.45 |
| 0.86 | 910.12 |
| 1.54 | 1065.27 |
| 2.07 | 1184.35 |
| 2.1 | 1205.41 |
| 2.23 | 1231.94 |
| 3.02 | 1306.35 |

According to the data in Sheet 1, the function of the concentration x of toluene and the height y of spectrum peak of the corresponding standard characteristic spectrum peak of toluene obtained through data fitting is $y=221.24x+705.77$.

The gas to be detected is input into the monitoring system and at least one group of characteristic spectrum peaks is output. By comparing the above characteristic spectrum peaks with the standard characteristic spectrum peaks of toluene, it is possible to determine that the gas to be detected contains toluene. According to the height of the characteristic spectrum peak, the concentration of toluene is determined using the standard curve function of toluene.

In an embodiment of the present disclosure, the above method is validated using a gas to be detected containing an actual concentration of 3.48 vol. % of toluene. When the gas to be detected is input into the monitoring system, a group of characteristic spectrum peaks of toluene with a height of spectrum peak of 1370.03 may be obtained. According to the function of the concentration x of toluene and the height y of the corresponding standard characteristic spectrum peak of toluene, that is $y=221.24x+705.77$, the concentration of toluene obtained is 3.002 vol. %. It may be seen that according to the method in this embodiment of the present disclosure, an error between a measured value of 3.002 vol. % and an actual value of 3.48 vol. % is 0.47 vol. %, and a relative error is 13.7%.

In an embodiment of the present disclosure, the above method is validated using a gas to be detected containing an actual concentration of 3.93 vol. % of toluene. When the gas to be detected is input into the monitoring system, a group of characteristic spectrum peaks of toluene with a height of spectrum peak of 1532.26 may be obtained. According to the function of the concentration x of toluene and the peak height y of the standard characteristic spectrum peak of toluene, that is $y=221.24x+705.77$, the concentration of toluene obtained is 3.74 vol. %. It may be seen that according to the method in this embodiment of the present disclosure, an error between the measured value of 3.93 vol. % and an actual value of 3.74 vol. % is 0.19 vol. %, and a relative error is 4.8%.

In an embodiment of the present disclosure, the above method is validated using a gas to be detected containing an actual concentration of 5.76 vol. % of toluene. When the gas to be detected is input into the monitoring system, a group of characteristic spectrum peaks of toluene with a height of spectrum peak of 2044.73 may be obtained. According to the function of the concentration x of toluene and the peak height y of the standard characteristic spectrum peak of toluene, that is $y=221.24x+705.77$, the concentration of toluene obtained is 6.05 vol. %. It may be seen that according to the method in this embodiment of the present disclosure, an error between the measured value of 6.05 vol. % and an actual value of 5.76 vol. % is 0.29 vol. %, and a relative error is 5%.

In summary, it may be seen that the error between the concentration of toluene measured by the monitoring method provided in this embodiment of the present disclosure and the concentration of toluene in the gas to be tested is less than 0.5%, and the measurement results are relatively accurate.

Finally, since the known content of toluene in the gasification tar accounts for about 1/20 of the tar, the concentration of tar in the gas to be detected may be obtained by multiplying the measured content of toluene by 20.

The specific embodiments described above provide further detailed explanations of the purpose, technical solution, and beneficial effects of the present disclosure. It should be understood that the above are only specific embodiments of the present disclosure and are not intended to limit the present disclosure. Any modifications, equivalent substitutions, improvements, etc. made within the spirit and principles of the present disclosure should be included within the scope of protection of the present disclosure.

What is claimed is:

1. A method for monitoring a gasification tar using a gasification tar monitoring system, the gasification tar monitoring system comprising a dust collector, a pressure controller, a dryer, a gas heat-insulation device, a gas pool, a gas detector, an optical monitor and a computer which are sequentially connected, wherein the dust collector is configured to filter solid particles in a gas when disposed at an exit of a gasifier; the pressure controller is configured to control a flow rate of the gas; the dryer is configured to control a humidity of the gas; the gas heat-insulation device is configured to control a temperature of the gas; the gas pool is configured to carry the gas; one end of the gas detector is connected to a laser through a first optical fiber, the laser is configured to irradiate the gas in the gas pool to generate a Raman scattering light, and the gas detector is configured to collect the Raman scattering light; another end of the gas detector is connected to the optical monitor through a second optical fiber, and the optical monitor is configured to adjust and amplify a light signal of the Raman scattering light; and the computer is configured to output a Raman spectrum and a composition and content of a tar;

wherein the method comprises:
inputting a gaseous standard compound with different concentrations into the gasification tar monitoring system sequentially, and outputting at least one group of standard characteristic spectrum peaks;
determining a standard curve function of the gaseous standard compound through heights of spectrum peaks of each group of standard characteristic spectrum peaks and concentration of the gaseous standard compound;
inputting a gas into the gasification tar monitoring system, and outputting at least one group of characteristic spectrum peaks;
determining a type of a compound by comparing the at least one group of characteristic spectrum peaks with the group of standard characteristic spectrum peaks;
determining a concentration of the compound corresponding to a height of a characteristic spectrum peak of the at least one group of characteristic spectrum peaks through the standard curve function corresponding to the compound; and determining a concentration of a tar in the gas through the concentration of the compound.

2. The method of claim 1, wherein the gaseous standard compound comprises any one of benzene, toluene, xylene, naphthalene or phenol.

3. The method of claim 1, wherein the dust collector comprises any one of ceramic film or quartz film.

4. The method of claim 1, wherein the laser comprises a laser with an output wavelength of 532 nm.

5. The method of claim 1, wherein a temperature inside the gas heat-insulation device is between 300° C. to 600° C.

6. The method of claim 1, wherein the gas pool comprises a corrosion-resistant chamber, wherein a socket is provided on the corrosion-resistant chamber, and the socket is configured to mount the gas detector.

7. The method of claim 1, wherein the gas pool comprises a corrosion-resistant chamber, wherein the corrosion-resistant chamber comprises a nickel-based alloy chamber.

8. The method of claim 1, wherein the optical monitor comprises:
- a Fourier Raman spectroscopy optical path configured to adjust an optical path of the Raman scattering light; and
- a charge coupled device configured to amplify a light signal of the adjusted Raman scattering light.

* * * * *